(12) United States Patent
Im et al.

(10) Patent No.: US 9,582,573 B2
(45) Date of Patent: Feb. 28, 2017

(54) INTERACTIVE COMPOSITE PLOT FOR VISUALIZING MULTI-VARIABLE DATA

(71) Applicants: Jean-Francois Im, Montreal (CA); Michael McGuffin, Montreal (CA); Rock Leung, Vancouver (CA)

(72) Inventors: Jean-Francois Im, Montreal (CA); Michael McGuffin, Montreal (CA); Rock Leung, Vancouver (CA)

(73) Assignee: SAP SE, Walldorf (DE)

( * ) Notice: Subject to any disclaimer, the term of this patent is extended or adjusted under 35 U.S.C. 154(b) by 509 days.

(21) Appl. No.: 13/951,298

(22) Filed: Jul. 25, 2013

(65) Prior Publication Data

US 2015/0033173 A1    Jan. 29, 2015

(51) Int. Cl.
*G06F 17/30*     (2006.01)

(52) U.S. Cl.
CPC ................... *G06F 17/30716* (2013.01)

(58) Field of Classification Search
None
See application file for complete search history.

(56) References Cited

U.S. PATENT DOCUMENTS

| | | | |
|---|---|---|---|
| 5,982,383 A | 11/1999 | Kumar et al. | |
| 6,750,864 B1 | 6/2004 | Anwar | |
| 6,842,176 B2 | 1/2005 | Sang'udi et al. | |
| 7,222,308 B2 | 5/2007 | Sauermann et al. | |
| 7,262,772 B2 | 8/2007 | Ebert | |
| 7,420,561 B2 | 9/2008 | Navratil et al. | |
| 7,728,836 B2 | 6/2010 | Kaiser | |
| 8,259,114 B2 | 9/2012 | Schwarzmann | |
| 8,346,682 B2 | 1/2013 | Steed et al. | |
| 8,446,412 B2 | 5/2013 | Robertson et al. | |
| 2003/0128212 A1* | 7/2003 | Pitkow | G06T 11/206 345/440 |
| 2003/0208429 A1* | 11/2003 | Bennett | G06Q 40/06 705/36 R |
| 2004/0148578 A1 | 7/2004 | McConaghy et al. | |
| 2004/0183800 A1 | 9/2004 | Peterson | |
| 2004/0236658 A1* | 11/2004 | Bowman | G06Q 10/06 705/36 R |
| 2006/0020623 A1* | 1/2006 | Terai | G06F 9/4411 |
| 2006/0070013 A1* | 3/2006 | Vignet | G06T 11/206 715/854 |

(Continued)

OTHER PUBLICATIONS

Pak Chung Wong and R. Daniel Bergeron, "30 Years of Multidimensional Multivariate Visualization," Chapter 1, pp. 3-33, Gregory M. Nielson, Hans Hagen, and Heinrich Mueller, Editors, Scientific Visualization: Overviews, Methodologies and Techniques, IEEE Computer Society. 1997.

(Continued)

*Primary Examiner* — Mark Zimmerman
*Assistant Examiner* — Nurun N Flora
(74) *Attorney, Agent, or Firm* — Fountainhead Law Group PC

(57) ABSTRACT

A technique is described for providing interactive features to a composite plot for visualizing a multi-variable dataset. The interactive features include the presentation of curved links and associative highlighting, both of which can assist a user in the exploration of possible relationships between different variables.

12 Claims, 9 Drawing Sheets

(56) References Cited

U.S. PATENT DOCUMENTS

| | | | |
|---|---|---|---|
| 2007/0255441 A1* | 11/2007 | Antanies | G05B 23/0232 700/108 |
| 2008/0055313 A1 | 3/2008 | Noppens | |
| 2008/0197228 A1* | 8/2008 | Mueller | B65H 23/195 242/410 |
| 2008/0222562 A1* | 9/2008 | Helfman | G06F 17/246 715/810 |
| 2008/0270923 A1* | 10/2008 | Connally | G06F 9/4443 715/765 |
| 2011/0087476 A1* | 4/2011 | Calvert | E21B 43/00 703/10 |
| 2012/0229466 A1* | 9/2012 | Riche | G06F 17/30572 345/440 |
| 2013/0050217 A1 | 2/2013 | Armitage | |
| 2014/0015837 A1 | 1/2014 | Soshin | |

OTHER PUBLICATIONS

Chris Stolte, Diane Tang, and Pat Hanrahan, "Polaris: A System for Query, Analysis, and Visualization of Multidimensional Relational Databases," IEEE Transactions on Visualization and Computer Graphics, vol. 8, No. 8, pp. 52-65. Jan.-Mar. 2002.

Jock D. MacKinlay, Pat Hanrahan, and Chris Stolte, "Show Me: Automatic Presentation for Visual Analysis," IEEE Transactions on Visualization and Computer Graphics, vol. 13, No. 6, pp. 1137-1144. Oct. 2007.

Edward J. Wegman, "Hyperdimensional Data Analysis Using Parallel Coordinates," Journal of the American Statistical Association, vol. 85, No. 411, pp. 664-675. 1990.

John W. Emerson, Walton A. Green, Barret Schloerke, Jasoncrowley, Dianne Cook, Heike Hofmann, and Hadley Wickham, "The Generalized Pairs Plot," Journal of Computational and Graphical Statistics, 22:1, pp. 79-91. Mar. 2013.

Alfred Inselberg, "The Plane with Parallel Coordinates," Visual Computer, vol. 1, pp. 69-91. 1985.

John A Hartigan, "Printer Graphics for Clustering, Journal of Statistical Computation and Simulation," vol. 4, No. 3, pp. 187-213. 1975.

* cited by examiner

INTERACTIVE COMPOSITE PLOT FOR VISUALIZING MULTI-VARIABLE DATA

BACKGROUND

Unless otherwise indicated herein, the approaches described in this section are not prior art to the claims in this application and are not admitted to be prior art by inclusion in this section.

In practice, many real-world datasets are multi-dimensional and include multiple variables. While multi-variable databases are good for showing correlation and relationships between different variables, there is a problem of presenting the data in a format that is easy for the user to process and consume. For example, a relational database can include a count of all the flowers in a garden based on the type of flower and the number of petals the flower has. Thus a count can be maintained for each combination of the two variables; type and petal number. Due to the amount of information present, it can be challenging for users to gain an overview of the data in a moderately sized database. Users must typically choose some small subset of dimensions (such as flowers of a specific petal number) or variables of interest (such as specific types of flowers) before visualizing the data. However, this traditional form of visualization does not provide an overview of all the multiple dimensions simultaneously.

SUMMARY

Embodiments of the present invention describe interactive composite plots for visualizing a multi-dimensional dataset. A composite plot contains a plurality of cells that are each configured to display a graph. Each graph, which is associated with a pair of variables, displays a plurality of elements that together are configured to visualize a subset of the data values from the dataset that are related to the pair of variables. A method or computer readable medium is described for providing interactive features to a composite plot that includes receiving a request to perform an interactive function on a first element of a graph that relates the first element to another graph from the plurality of graphs, the first element representing an input value of a variable from the pair of variables, and performing the interactive function in response to the request. In one embodiment, performing the interactive function comprises determining that the request is a curved link request and discovering a second element of the composite plot that represents the input value. Performing the interactive feature can further include generating a highlighted line linking together the first element and the second element. Performing the interactive feature can further include highlighting the first element and the second element simultaneously. In one embodiment, statistical information related to the input value can be displayed in a predefined area of the composite plot.

In another embodiment, performing the interactive feature comprises determining that the request is an associative highlighting request, identifying a graph type associated with another graph from the plurality of graphs and applying associative highlighting to the another graph based on the graph type. In one example, applying the associative highlighting comprises highlighting elements in another graph that represent the input value when the graph type is a scatterplot. In another example, applying the associative highlighting comprises identifying an aggregation process used in generating a second element of another graph when the graph type is a bar chart and partially highlighting the second element of another graph when the aggregation process is a sum operation, wherein the second element of the another graph is partially highlighted according to the portion of second element that is attributed to the input value. In one example, applying the associative highlighting further comprises identifying a statistical operation used to generate the second element when the aggregation process is the statistical operation, identifying a set of data values that are used in generating the second element, identifying a subset of the set of data values that represent the input value, calculating a statistical value based on the statistical operation and the subset of data values, and annotating the second element in the another graph according to the statistical value.

In another embodiment, a system is described that includes a processor, a display, and memory storing instructions configured to present, on the display, a plurality of graphs for analyzing data values in the multi-variable dataset, wherein each graph is associated with a pair of variables and includes a plurality of elements configured to visualize a subset of the data values that are related to the pair of variables, receive an associative highlighting request on a first element of a graph, the first element representing an input value of a variable from the pair of variables, identify an aggregation process used in generating a second element of the another graph, and partially highlighting the second element of the another graph when the aggregation process is a sum operation, wherein the second element of the another graph is partially highlighted according to the portion of second element that is attributed to the input value. In one example, the memory further stores instructions to identify a statistical operation used to generate the second element, when the aggregation process is the statistical operation identify a set of data values that are used in generating the second element, identify a subset of the set of data values that represent the input value, calculate a statistical value based on the statistical operation and the subset of data values, and annotate the second element in the another graph according to the statistical value.

The following detailed description and accompanying drawings provide a better understanding of the nature and advantages of the present invention.

DETAILED DESCRIPTION

Described herein are techniques for generating composite plots which are useful to visualize multi-variable data. The composite plots can help a viewer compare different variables, identify relationships between variables, reveal structures in the data, and draw conclusions based on the multi-variable data. Some of the composite plots can include interactive features which can further assist in revealing correlations and relationships between different variables that would otherwise go unnoticed.

The Composite Plot

A composite plot provides the multi-dimensional data in a format that is easy for a user to process and consume. The composite plot contains a plurality of cells that each present a chart or graph configured to show the relationship between two variables. The terms chart and graph shall be used interchangeably in this application. One or more charts or graphs can be used to describe each variable combination. One type of variable is a dimension. A dimension is an independent variable for describing inputs. A dimension can have multiple possible input values. For example, the values for the dimension "country of origin" can be United States of America or Germany. Another type of variable is a measure. A measure is a dependent variable that is the output or effect of the independent variable or variables. For example, a measure can be the product sales in the United States of America. As another example, a measure can be the manufacturing expenses to produce automobiles (i.e., an input for product dimension) for Germay (i.e., an input for region dimension) during the Spring (i.e., an input for season dimension) of 1999 (i.e., an input for year dimension). In practice, many real-world datasets are multi-dimensional, multi-variable datasets.

Figure 1:
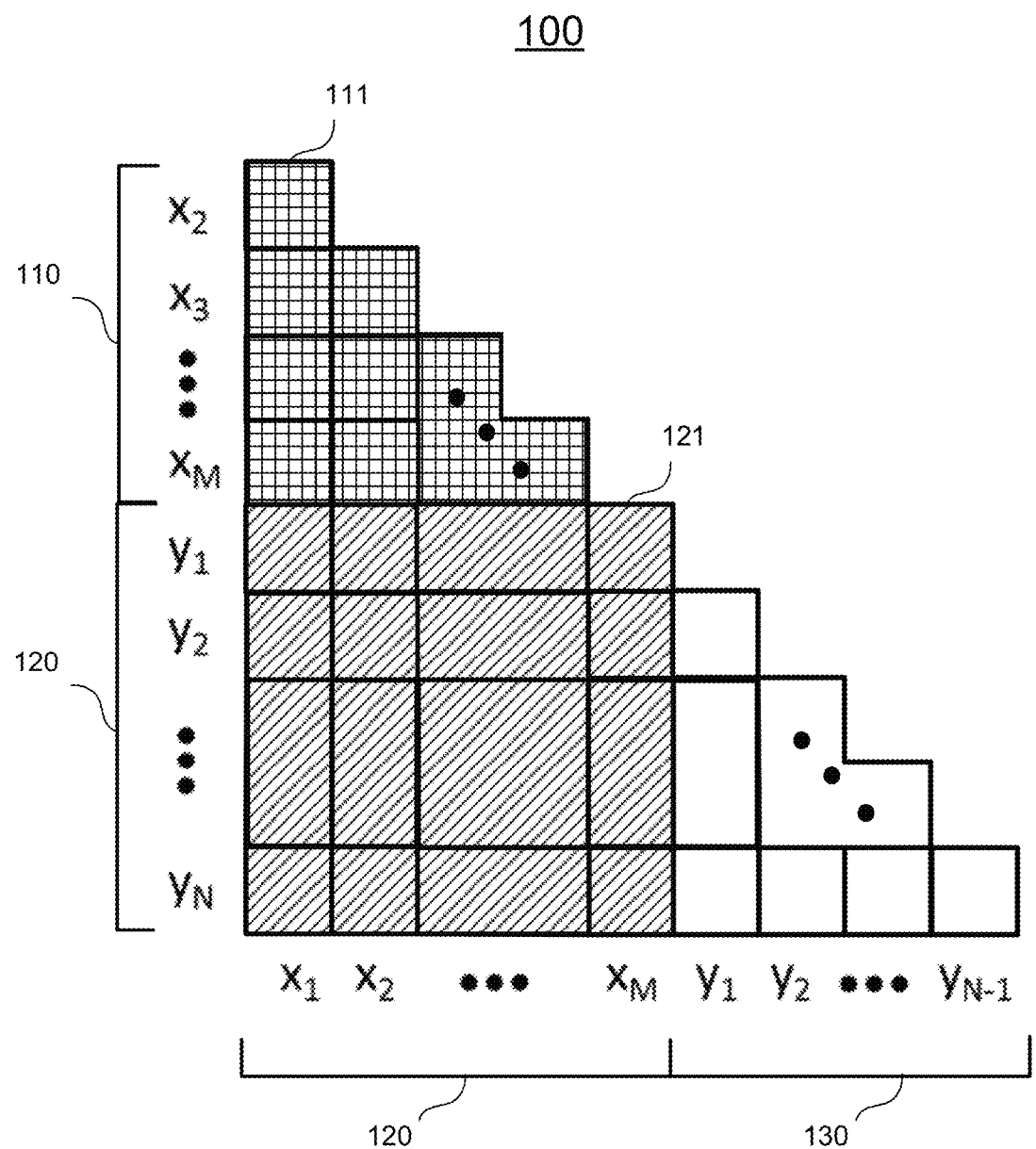
FIG. 1 illustrates an exemplary composite plot.

FIG. 1 illustrates an exemplary composite plot. A composite plot consists of a plurality of cells used to visualize a multi-variable dataset by displaying a chart or graph in each of its cells. Each chart or graph is configured to visualize data related to a pair of variables from the dataset. In one example, the chart or graph can be used to identify relationships between the variables. Here, the dimensions range from $x_1$ to $x_M$ and the measures range from $y_1$ to $y_N$. A particular cell of composite plot 100 displays a graph describing a variables pair as indicated by the x-coordinate and y-coordinate of the cell. This is also known as the cell's variables pair type. For example, cell 111 describes a variables pair of dimension $x_1$ and dimension $x_2$ and thus has a variables pair type of dimension-dimension. Graphs that describe a dimension-dimension variables pair type can also visualize the value of a particular measure that is associated with the two dimensions. For instance, a graph displayed in cell 111 can present the aggregated values of a measure for the two dimensions. Similarly, cell 121 describes a variables pair of dimension $x_M$ with measure $y_1$ and thus has a variables pair type of dimension-measure. In some examples, each possible pair of variables is visualized in a cell of composite plot 100. This can allow the exploration of possible relationships that can be revealed between different variables.

In one embodiment, cells of the composite plot can be arranged into clusters according to their variables pair type. For example, cells having a measure-dimension variables pair type can be clustered together, cells having a measure-measure variables pair type can be clustered together, and cells having a dimension-dimension variables pair type can be clustered together. Here, cluster 110 includes cells having a dimension-dimension variables pair type, cluster 120 includes cells having a measure-dimension variables pair type, and cluster 130 includes cells having a measures-measures variables pair type. In some examples, the cells can be arranged such that the composite plot forms a triangular structure where cells having the same variables pair type are clustered together as shown in FIG. 1. The triangular structure can be advantageous in that the unused portion of the composite plot can be used to present other information to the viewer.

In some embodiments, cells in the composite plot can be configured to visualize data using one or more types of charts. In one embodiment, the type of variables that are being visualized in a chart can dictate the type of chart selected. This can be because some types of chart are better suited to reveal relationships between certain variable pairs or certain charts are ill suited to visualize particular variables. For example, when a scatterplot is used to visualize a pair of dimensions, a grid of points results which is rather uninformative. Similarly when a scatterplot is used to visualize a dimension and a measure, overplotting can result thus making it difficult to draw conclusions from the graph. In some examples, a heatmap or parallel bar chart can be suitable for visualizing a pair of dimensions, a barchart or line chart can be suitable for visualizing a measure as a function of dimension, and a scatterplot can be suitable for visualizing a pair of measures. In other examples, the chart type applied to cells of a given variables pair type can be predefined. In yet other examples, the definitions can include three types of charts, wherein each type of chart is assigned to a possible variable pair (e.g., dimension-dimension, dimension-measure, measure-measure). By limiting the different types of charts that are used to visualize the data, the composite plot can be easier to interpret, particularly for casual users.

Figure 2:
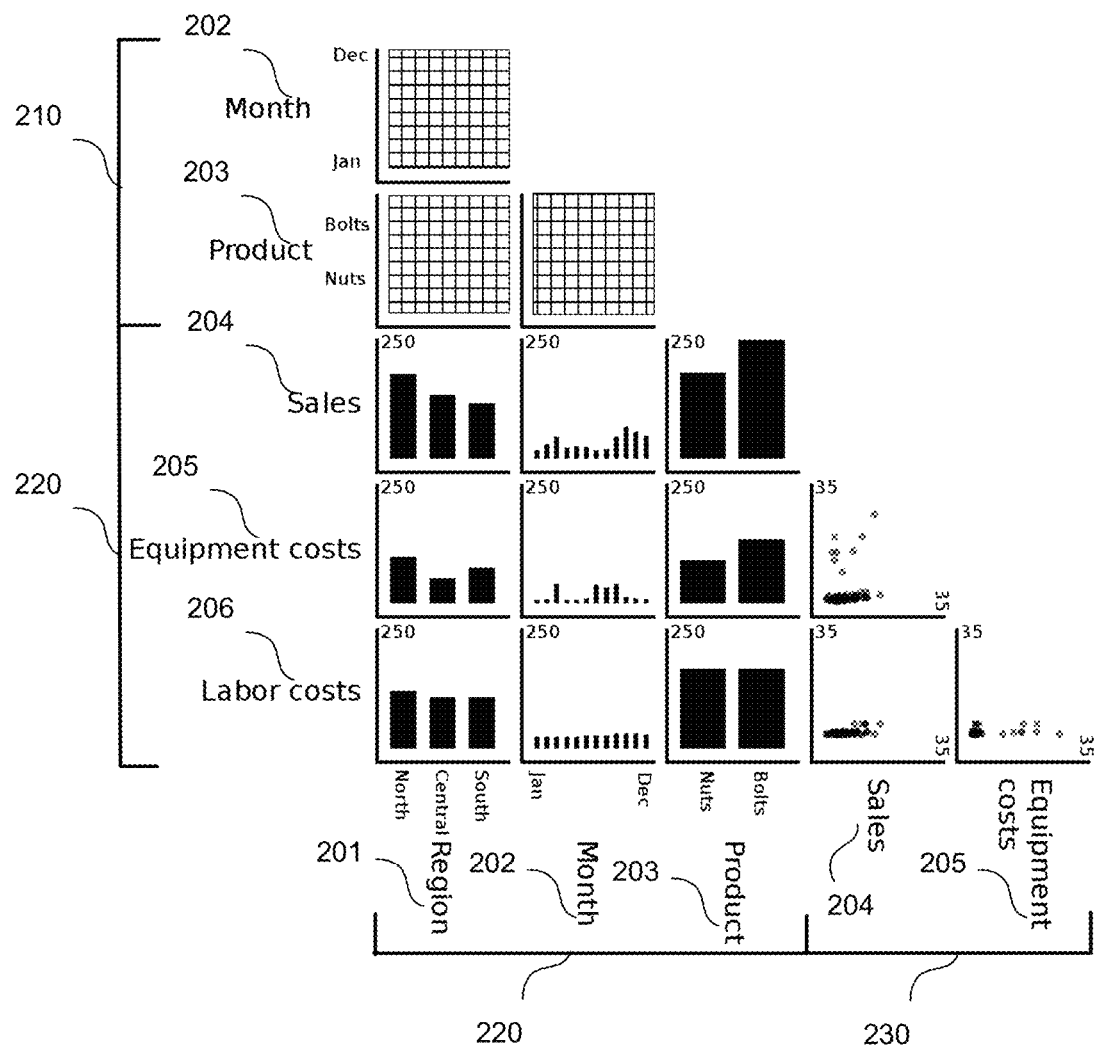
FIG. 2 illustrates another exemplary composite plot.

FIG. 2 illustrates another exemplary composite plot. Composite plot 200 includes a plurality of cells arranged in a triangular structure to describe the relationship between six variables. Region 201, month 202, and product 203 are dimensions (i.e., independent variables) while sales 204, equipment costs 205, and labor costs 206 are measures (i.e., dependent variables). Each possible variable pair is included in composite plot 200. As shown, composite plot 200 has been clustered into cluster 210 which compares dimensions with dimensions, cluster 220 which compares dimensions with measures, and cluster 230 which compares measures with measures. The cells of each cluster are visualized using a chart type that is associated with the variables pair type. Here, cells having dimension-dimension variables pair type are visualized using a heatmap, cells having dimension-measure variables pair type are visualized using a barchart, and cells having measure-measure variables pair type are visualized using a scatterplot. By limiting the chart types to three and organizing them in clusters, composite plot 200 is both easy to read and analyze.

In some examples, the cell's chart can be optionally scaled. Scaling is a technique that when applied better utilizes the visible space available in the cell. For example, scaling can enlarge or shrink data values to be displayed in the chart, resulting in a chart that has been stretched or expanded. This allows details in closely clustered data values to be spread further apart and thus easily seen. In one example, the scaling factor can be determined based on the variable's data values that are to be displayed in the cell. This can result in better utilization of the visible space in the cell. In another example, the scaling factor can be determined based on the variable's range of data values. This can result in uniformity in the presentation of the data values related to the variable in exchange for non-optimized use of space. The range of data values for a variable can be limited to the values that are used to populate a given cell, thus allowing the space in the cell to be better utilized. The composite plot may help reveal structure and relationships in multivariate data that otherwise might go unnoticed in the process of exploratory data analysis.

Interactive Features

The composite plot can include one or more interactive features to assist a viewer in drawing correlations, relationships, and conclusions from the multi-variable dataset. The interactive features include a datatip, a curved link, and associative highlighting. One or more of these features can be presented along with the composite plot to provide additional information about charts or relationships between charts. Exemplary user inputs for interacting with the composite plot include a mouse and/or a textual search box.

Figure 3:
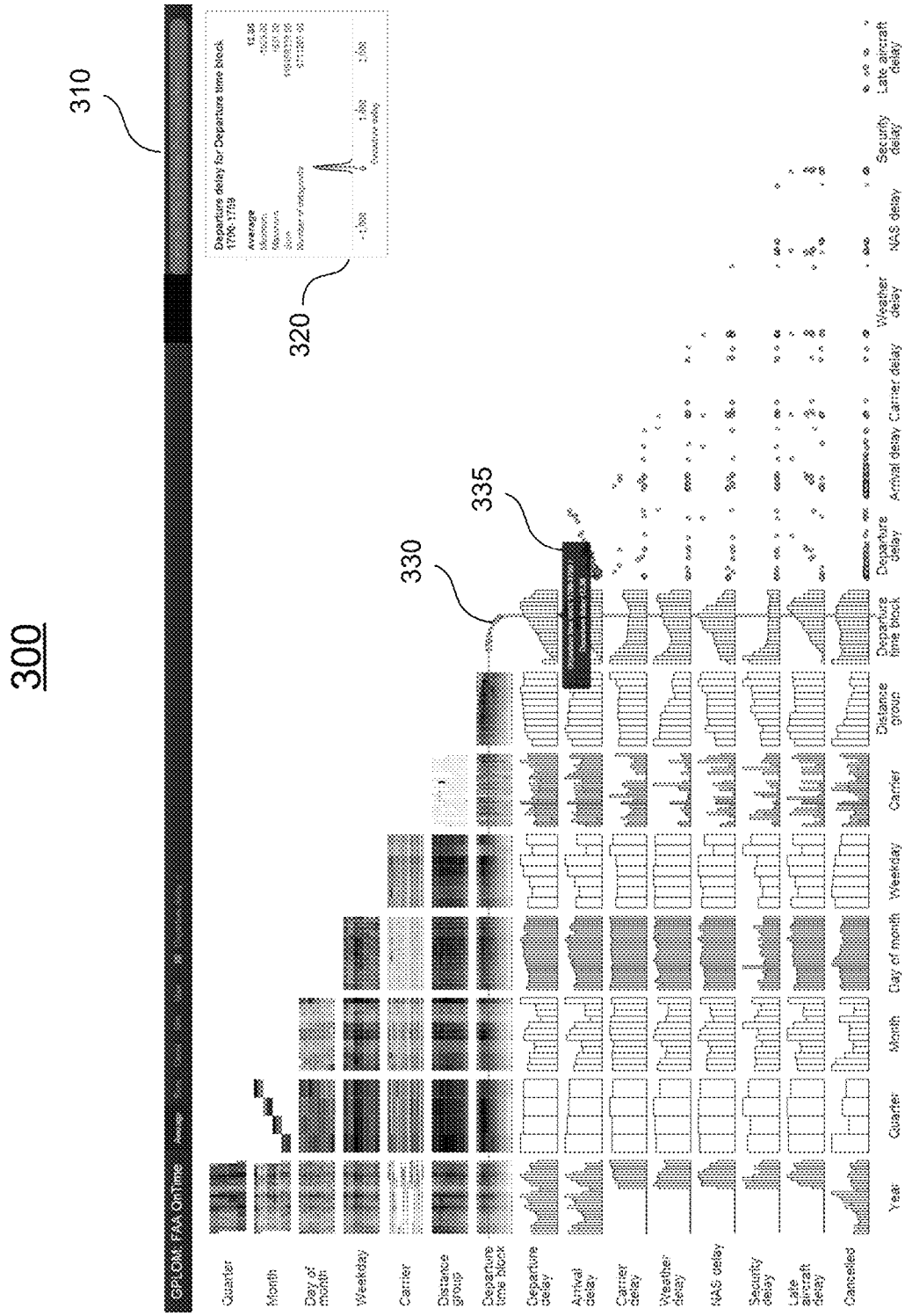
FIG. 3 illustrates an exemplary composite plot that includes interactive features.

FIG. 3 illustrates an exemplary composite plot that includes interactive features. Composite plot 300 includes a plurality of cells where each cell displays a chart that illustrates the relationship between two variables of a multivariable dataset. Composite plot 300 further includes interactive features 310, 320, and 330. Each of these features can be used to discover relationships between different cells or to display additional information about one or more cells. As shown in FIG. 3, composite plot 300 includes textual search box 310. Textual search box 310 is configured to receive text. A search can be performed on composite plot 300 based on the received text to identify relevant cells. In one example, cells that describe a variable can be identified when the name of a variable is entered into textual search box 310. In another example, each cell can contain one or more keywords, which when entered into textual search box 310, results in the identification of the cell. The identification can also be scaled to data values of the data set. For example, data values from the data set can be identified by entering the name of an input value associated with a dimension or the name of a measure. Identified cells or data values can be denoted in the composite plot through highlighting, circling, or forms of visual identification. Thus, cells (or data values) related to variables of interest can be quickly identified, which can be particularly useful in composite plots containing dozens of cells.

Composite plot 300 further includes datatip 320. Datatip 320 can be configured to present additional information about a target cell, graph, graph element, or data value of composite plot 300. The target can be set according to the position of a cursor on the composite plot or the text entered into textual search box 310. For example, moving a cursor over the data point can set the target. In another example, moving the cursor over an element of the graph such as a bar of a bar graph or a square a heatmap can set the target as the input value or values associated with the bar or square. Selection of the target can occur by clicking on the element or data point. In yet another example, the target can be set as an input value when the input value's name is entered in a textual search box as described above. The additional information presented in datatip 320 can include statistics or metadata about the target. As shown here, datatip 320 presents the average, minimum, maximum, sum, number of data points that are associated with a dimension's input value, and a kernel density estimate plot. In other examples, additional information related to the target can be displayed in datatip 320. As shown here, datatip 320 can be rendered in the top right portion of composite plot 300. In other examples, datatip 320 can be rendered at another open area of composite plot 300 that is not being used to present a cell of composite plot 300. In some examples, more than one datatip 320 can be presented for each target that has been set. Multiple targets can be set by the user for example when a box of a heatmap has been selected. In other examples, additional information about the most recently selected target is displayed on the datatip.

Composite plot 300 can also include curved links. A curved link is a visual overlay that links together charts of the composite plot that are related. A chart can be related to another chart when both charts include a graphic element that describes the same variable or input value of a dimension. The curved link feature can be activated for a selected data point or graph element. Depending on the implementation details, selection of the data point or graph element can occur by using a key stroke, a touch gesture (such as on a tablet) or a mouse click, or by hovering a mouse cursor over a bar or heatmap element. When activated, a curved link simultaneously highlights elements in different charts or generates highlighted lines that link elements from different graphs together. Both techniques are to indicate a relationship between the elements. In some embodiments, both techniques can be applied simultaneously. For example, a bar representing an input value can be highlighted along with bars representing the input value in other bar graphs as a means for illustrating the presence of the input value in the bar graph. Moreover, highlighted lines can be added to link the elements to one another. This allows bars that are related to the same input value to be easily identifiable. By visually linking elements that are generated from data values associated with the same input value, relationships between charts can be explored. In some examples, curved links can be toggled on and off according to user input. In other examples, the curved links can be highlighted different colors depending on the method used to select the data point or graph element. For instance, selections that occur from hovering over a data point for a predefined period of time can be highlighted one color while selections that occur from clicking on a data point can be highlighted a different color.

Here, an input value "1700-1759" of dimension "departure time block" has been selected for generation of a curved link. The input value can be selected by moving a mouse cursor over the input value in one of the charts for a predefined period of time or alternatively by selecting the input value in one of the charts by using a mouse click. In other examples, the input value can be entered as a textual string in textual search box 310. In response to the selection and activation of the curved link feature, curved link 330 is generated which highlights portions of the charts that relate to the input value "1700-1759." Text "1700-1759" can be overlaid at a bend of the curved link to identify the input value that has been selected. This can be particularly useful in charts with many input values. The curved link can be used to compare the selected input value with other input values and also to compare the output generated from the input value in different charts. In other examples, the presentation of the curved link can be personalized. For instance, a highlight color for the curved link can be specified when the input value is selected. Similarly, multiple curved links for different input values can be displayed or toggled on and off by the viewer. In yet other examples, datatip 320 can be configured to display additional information relating to the selected input value that is related to the curved link. Thus, the curved link and the datatip are simultaneously presented to provide relevance information and additional information about a selected input value.

In some examples, the curved link can be accompanied by text string 335. Text string 335 can be displayed on or near the curved link. In one example, text string 335 can display origination information describing the data point or element that was used in creating the curved link. This can be particularly useful in densely populated graphs to ensure that the desired data value or input value was selected. Furthermore, the origination information can be useful to determine where curved link originated from. Here, text string 335 titled "Departure time block: 1700-1759/Departure delay 12.30" is presented upon selection of a data point or input value of a cell for creation of curved link 330. The selection can be from rolling a mouse cursor over the data point/bar, selecting the data point/bar, or entering text related to the data point/bar into the textual search box.

Figure 4:
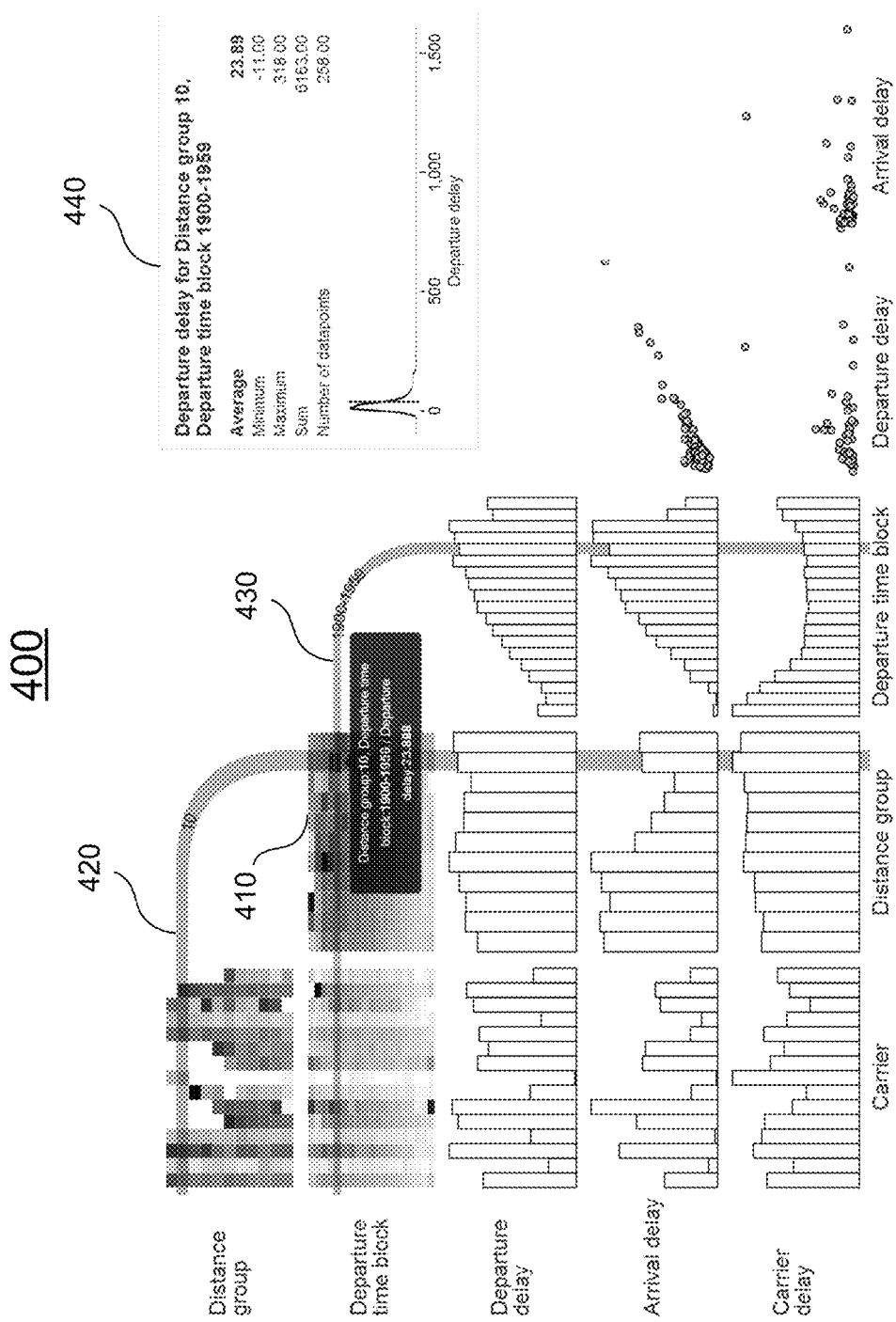
FIG. 4 illustrates an exemplary composite plot that contains curved links.

FIG. 4 illustrates an exemplary composite plot that contains curved links. Composite plot 400 describes a scenario where multiple input values have been selected for highlighting. In one example, multiple input values can be selected simultaneously when an element of a heatmap that represents two input values (e.g., an input value from one dimension and another input value from another dimension) is selected. In another example, multiple input values can also be selected through an iterative process of selecting a first input value and then selecting a second input value. The input values can be from the same dimension or different dimensions and selection can be by clicking, tapping, or otherwise selecting an element that represents the input value. The selected element can be part of a heatmap, a barchart, or other chart. When multiple input values are selected (either simultaneously or in order), a curved link can be generated for each input value. The curved links can be the same or different color. Here, a box of the heatmap displayed in cell 410 selected. The box represents an input value of 10 for the "distance group" dimension and an input value of "1900-1959" for the "departure time block" dimension for a Departure Delay measure value: 23.888. In response to the selection, a curved link is generated for each input value. Curved link 420 highlights portions of charts that are related to the input value of 10 for the distance group while curved link 430 highlights portions of charts that are related to the input value of "1900-1959" for the departure time block. In some examples, datatip 440 can be configured to provide additional information related to the selected input values. In other examples, multiple datatips can be provided for each curved link.

The interactive features of the composite plot can include associative highlighting. Associative highlighting is a technique for annotating or highlighting a composite plot to show relationships between charts. Elements of a chart can be highlighted or annotated according to a selected input value to relate the elements of the graph and the selected input value. In some examples, associative highlighting can be applied to each element in a chart. For instance, associative highlighting can be applied to each bar in a bar chart. The associative highlighting feature can be activated for a given data point or graph element using a keystroke or mouse click. In some examples, a right mouse click can generate a pop up menu that includes options for activating curved links or associative highlighting on a selected data point or element.

Associative highlighting can be applied using various techniques. The determination of whether to apply associative highlighting to a given chart and the technique to apply can depend on the chart's aggregation process and/or the chart type. In one embodiment, associative highlighting includes selectively highlighting data points that are displayed on a chart when the chart type is a scatterplot. Data points of a scatterplot can be selectively highlighted according to the selected input value. For example, data points displayed on a scatterplot that are related to a selected input value can be highlighted. Through highlighting of the data points related to the selected input value, clusters of highlighted data points can form thus allowing generalizations to be made regarding the input value according to the distribution of the highlighted data points.

In another embodiment, associative highlighting includes highlighting a portion of an element when a chart's aggregation process is a sum or count operation. A sum or count operation can add or count the number of data points that are related to a given input value. For example, a bar chart displays the fruit sold during a week where one bar of the bar chart can represent the total sum of apples sold during the week. Thus, the bar includes all the apples sold from Monday to Sunday of the week. Other bars in the bar chart would represent the totals for other fruit items being sold during that week. Now assume an input value "Monday" is selected for associative highlighting from a dimension "Day of the Week." When associative highlighting is applied to the bar chart, the bars in the bar chart can be selectively highlighted to illustrate the portion of food sales that are attributed to "Monday." As a result, the bar representing apples can be partially highlighted to illustrate the ratio between apples that were sold on Monday and total apples that were sold that week. For instance if half of the bar is highlighted, then it is understood that half of the sales of apples sold that week happened on Monday. Similarly, the proportion of other fruit sold on Monday can be illustrated by highlighting the other bars of the bar chart.

Figure 5:
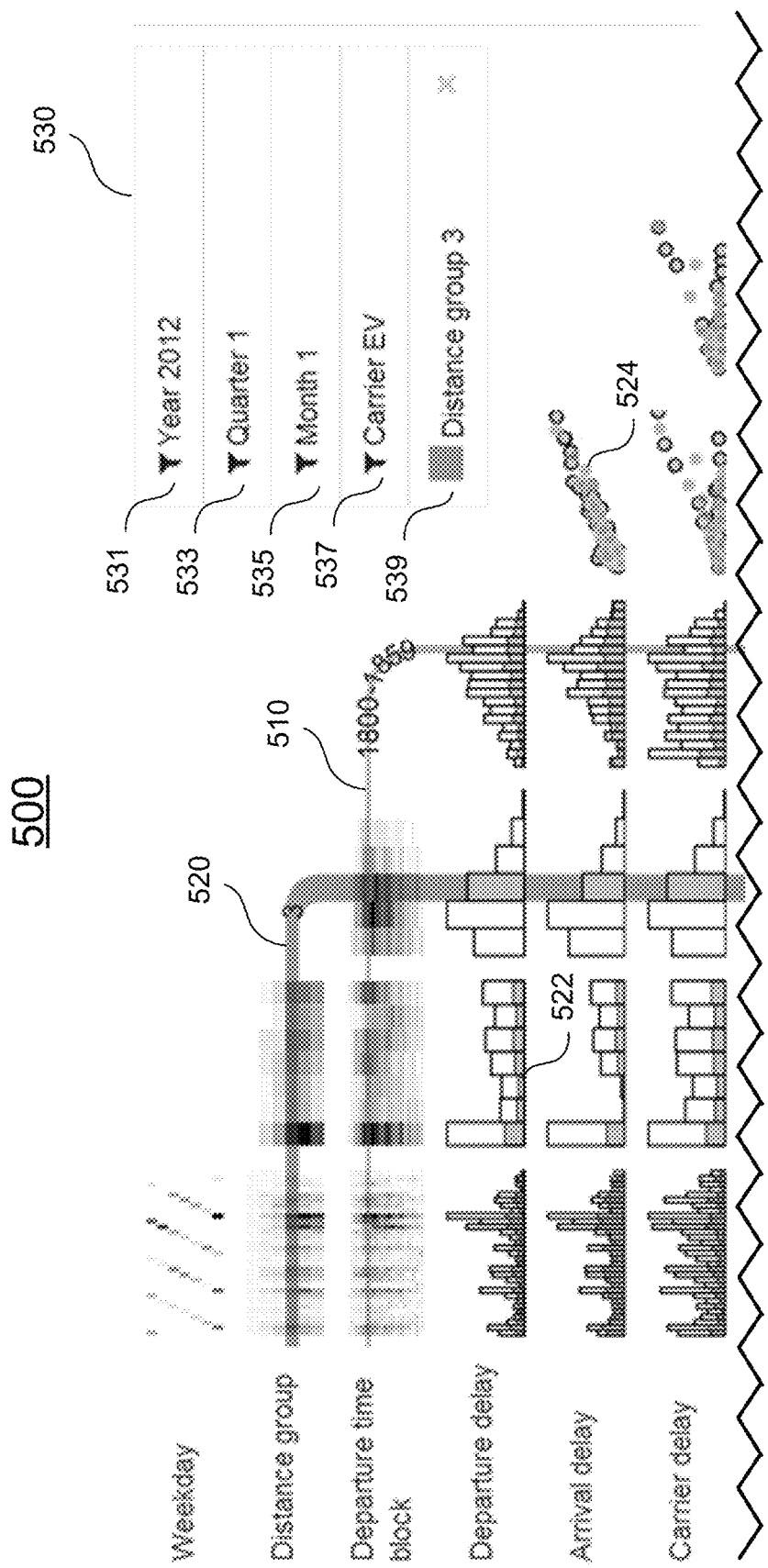
FIG. 5 illustrates an example of associative highlighting.
Figure 6:
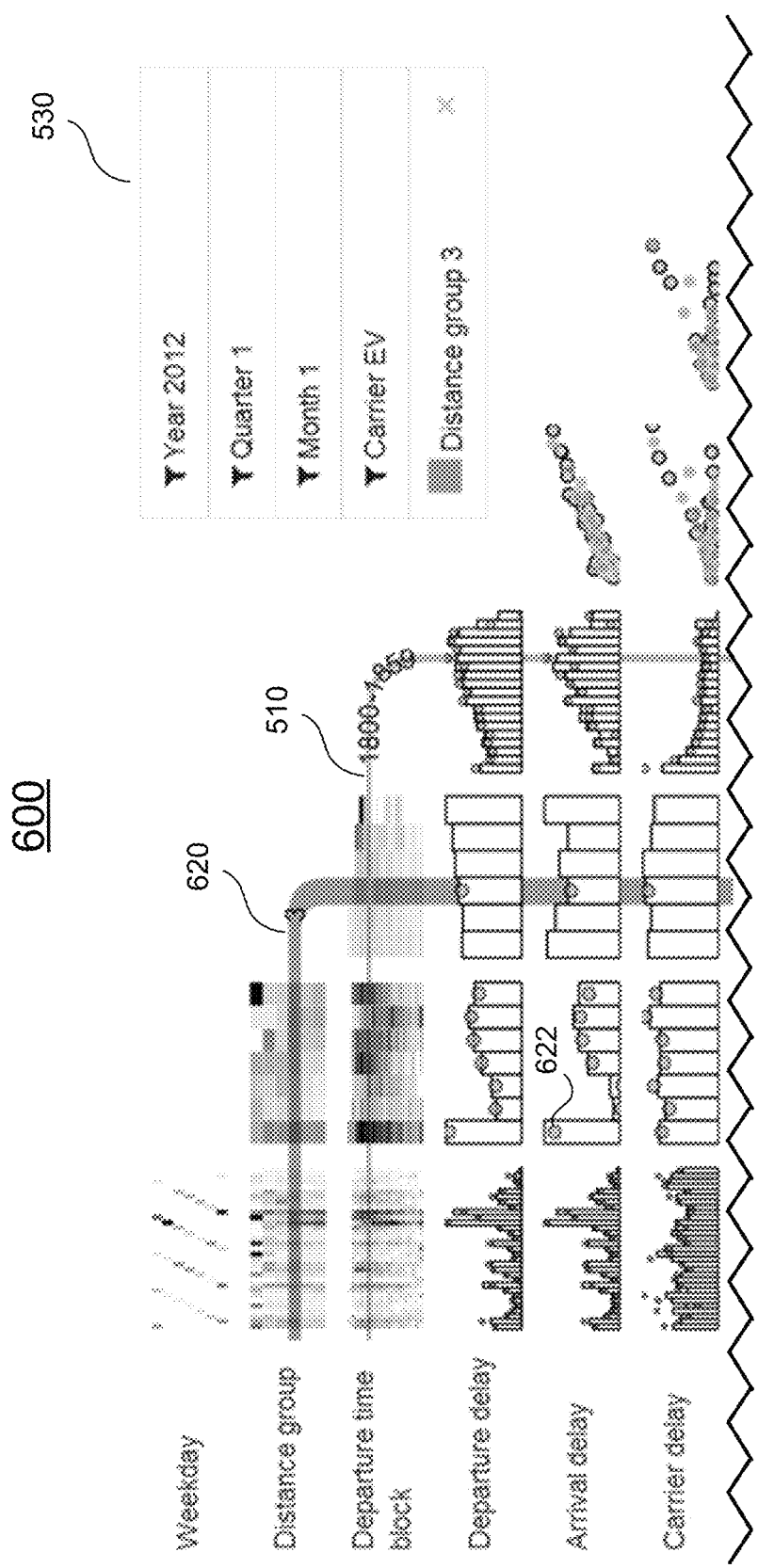
FIG. 6 illustrates another example of associative highlighting.

In another embodiment, associative highlighting includes annotating elements in a chart. Elements in a chart, such as bars in a bar chart, can be annotated to present information related to the selected input value. In one example, the annotation can be based on the same statistical operation that has been performed on the elements of the chart. For instance, the same statistical operation that has been performed to generate the chart can be applied to the data points of the chart that are related to the selected input value to generate a statistical value representing the selected input value. The statistical value can be presented alongside (or annotated on) the element to contrast the overall statistical analysis and the statistical analysis of the selected input value. The statistical analysis applied to the chart can be an aggregation technique such as a mean, average, median, min, max, or other statistical operation FIGS. 5 and 6 illustrate two examples of associative highlighting. Each figure illustrates a snippet of a composite plot that contains multiple cells each containing a chart or graph. FIG. 5 illustrates an exemplary snippet of a composite plot that includes highlighting of elements and data points. As shown in snippet 500, curved link 510 links together multiple elements of graphs using a highlighted line that runs through multiple elements. Text overlays curved link 510 to identify the input value that is related with curved link 510. Snippet 500 further includes associative highlighting. Associative highlighting includes a highlighted line 520 that runs through multiple elements related to the input value. This can identify the input value in which associative highlighting is being applied. Text overlays highlighted line 520 to identify the input value which associative highlighting is being applied. Associative highlighting further includes partial highlighting 522 that highlights a portion of elements in other charts to identify the portion of the element that can be attributed to the input value.

With respect to the cells that contain a scatterplot, associative highlighting further includes highlighted data points 524 to identify the elements that are related to the input value. Text can overlay one or more of the highlighted portions to identify the input value that is related to the associative highlighting. In some examples, different colors or patterns can be used to highlight different input values or the interactive feature type.

Snippet 500 further includes variable selector 530. Interactive features such as curved links or associative highlighting can be performed in response to a selected variable such as an input value of a dimension or a measure. In one embodiment, the variable can be selected by moving a cursor over the desired variable and selecting the variable. In other embodiments, the variable can be selected by using variable selector 530. Variable selector 530 is a graphical user interface that is configured to present a series of drop down menus. Each drop down menu includes one or more options, which can vary depending on previously selected options. Here, variable 539 has been selected after selecting option 537, option 535, option 533, and option 531. Upon selection of variable 539, associative highlighting 520 is generated on snippet 500 of the composite plot. The highlight color that is applied to either the curved link or associative highlighting can also be set by variable selector 530. As shown here, variable 539 has been selected and a highlight color is assigned to the associative highlighting.

FIG. 6 illustrates another exemplary snippet of a composite plot that includes annotating elements and highlighting data points. Snippet 600 is similar to snippet 500 of FIG. 5 in that both snippets have selected an input value of "distance group 3" to perform associative highlighting and have curved link 510 for input value "1800-1859" displayed.

However, snippet 600 includes a different variation of associative highlighting due to a different statistical analysis having been performed on the bar charts of snippet 600. Examples of statistical analysis include min, max, and average. As shown here, the bar charts of snippet 600 have been annotated. For example, annotation 622 displays a dot along a bar of the bar chart to illustrate the results of the statistical analysis being performed on a subset of the dataset that contains the selected input value of "distance group 3." As shown by annotation 622, the results of the statistical analysis on the subset of data points yields a lower value that the statistical analysis being performed on all points since annotation 622 is at a lower point than the bar of the bar chart.

Figure 7A:
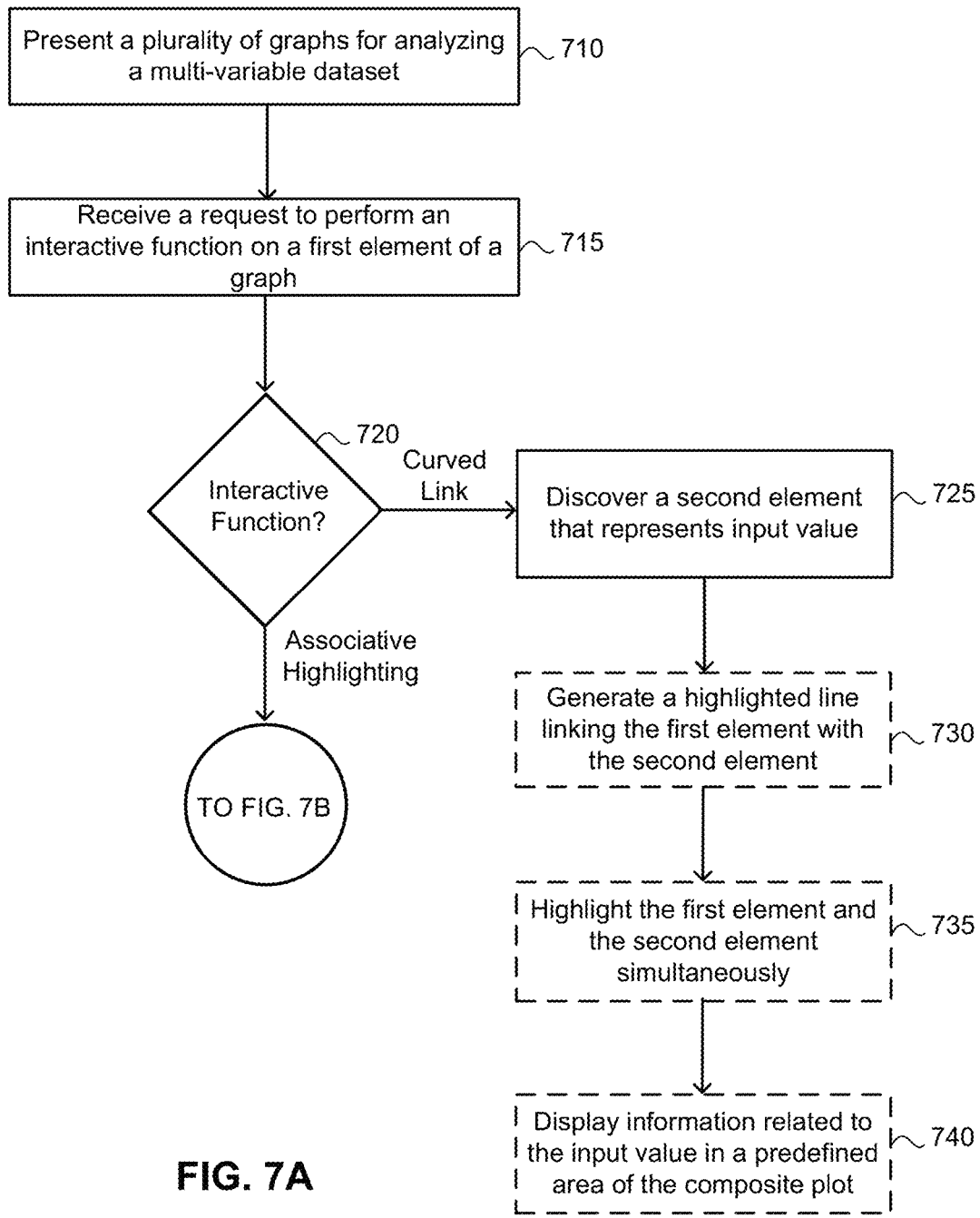
FIGS. 7A and 7B illustrate an exemplary process for visualizing multi-dimensional data.
Figure 7B:
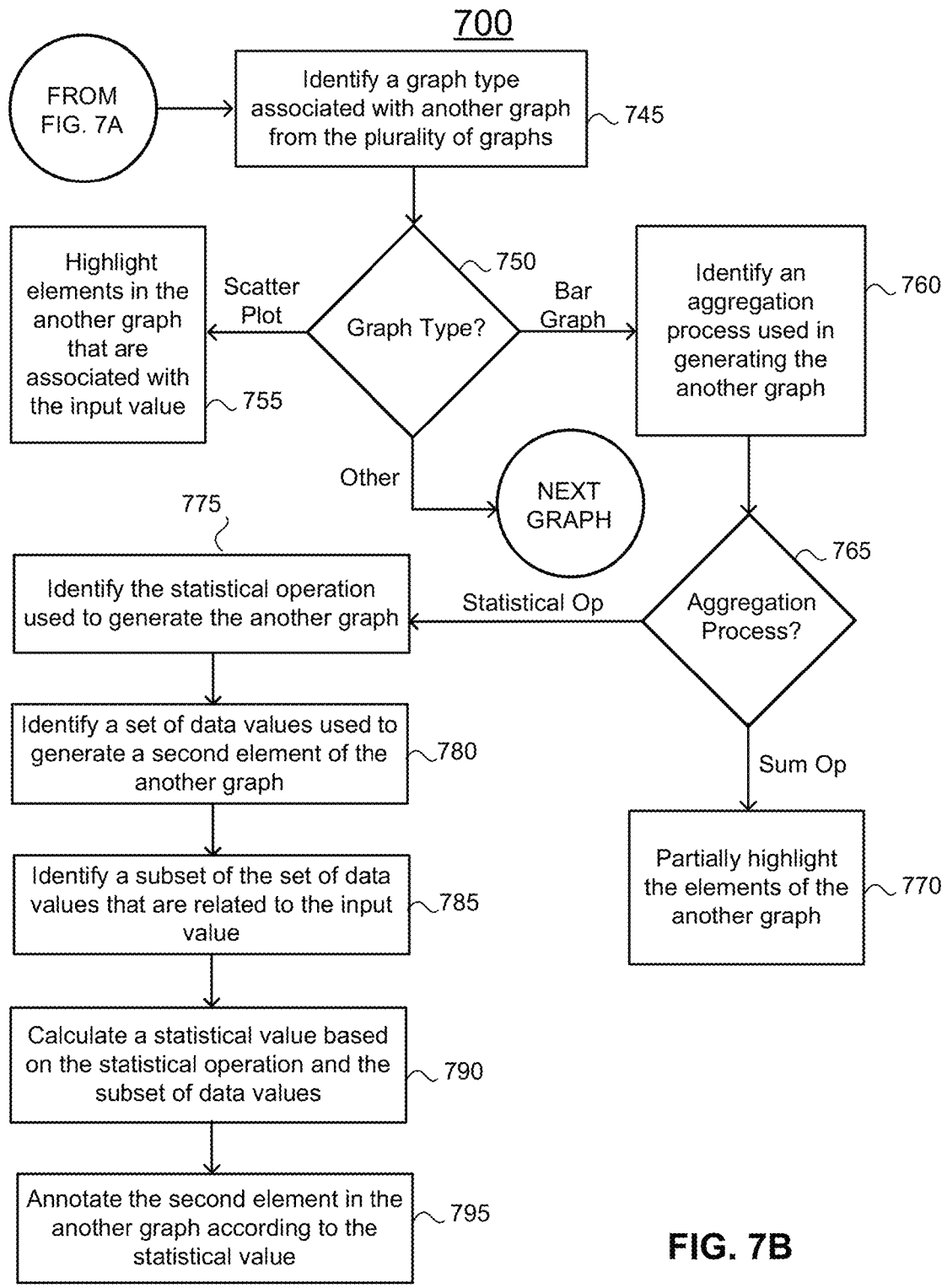

FIGS. 7A and 7B illustrate an exemplary process for visualizing multi-dimensional data. The process, which is configured to handle requests to perform interactive functions on a composite plot, can be stored in computer readable media for execution by a processor. Process 700 begins by presenting a plurality of graphs that each contain a plurality of elements at 710. Each of the plurality of graphs can reside in a cell of a composite plot that is triangular in structure. The composite plot can be presented on a display connected to the processor. In one example, the elements can be data points that represent data values of the multi-dimensional dataset. In another example, the elements can be bars in a bar graph or cells in a heatmap that have been generated to represent a collection of data points. In some examples, each graph can represent a variable pair. The variable pair can dictate the type of chart that is used to visualize data related to the variable pair.

After presenting the plurality of graphs, a request is received to perform an interactive function on a first element of a graph at 715. The request can be received from a textual search box, a touch gesture (e.g., tapping or swiping on a touch interface), or a mouse click. A determination is made on what the interactive function is at 720. If the request is for a curved link, process 700 discovers a second element of the composite plot that represents the input value at 725. The second element can be in the same graph as the first element or a different graph. For example, the second element can be another bar residing in a different bar graph that represents the input value. In another example, the second element can be another cell in the heatmap of the first element.

Once the second element has been discovered, process 700 can link the first and second element. In one example, process 700 can optionally generate a highlighted line linking the first element to the second element at 730. The highlighted line can be used to visualize the relationship between the first element and the second element. The relationship can be that they both are related to the input value. In another example, process 700 can highlight the first element and the second element simultaneously at 735. Simultaneous highlighting can be used to visualize the relationship between the two elements. In some examples, 725, 730, and 735 can be repeated to discover elements of the composite plot that belong to particular chart types composite plot and are related to the input value. Here, a curved link can connect elements in the composite plot that are part of a bar chart or a heatmap and are related to the input value can be linked together. Elements in a scatterplot are ignored. Process 700 can also optionally display information related to the input value in a predefined area of the composite plot at 740. For example, additional information such as statistics can be presented in a datatip of the composite plot. The datatip can be located as a predefined location of the composite plot that is not occupied by a cell.

If the request is for associative highlighting instead of a curved link, process 700 continues by iterating through the plurality of graphs in the composite plot. For each graph, process 700 identifies a graph type associated with the graph at 745. A determination is made on what the graph type is at 750. If the graph type is a scatterplot (or other predefined graph type), elements such as data points that are associated with the input value are highlighted at 755. If instead the graph is not a scatterplot or a bar graph (or other predefined types of graphs which associative highlighting will be applied to), then process 700 iterates to the next graph and returns to 745.

If the graph type is a bar graph (or other predefined chart type), process 700 identifies an aggregation process used in generating the graph. A determination is made on what the aggregation process is at 765. If the aggregation process is a sum operation (or other predefined operation), partial highlighting is performed on the elements (e.g., bars) of the graph at 770. Each bar in the graph is generated by combining a plurality of data values. A portion of the plurality of data values is related to the selected input value. Partial highlighting highlights a portion of the bar that illustrates the proportion of the plurality of data values that are related to the selected input value. This can be used as a visual indicator to determine the effect that the selected input value has on the bar.

If the aggregation process is a statistical operation (or other predefined operation), the statistical operation used to generate elements of the graph can be identified at 775. The set of data values used to generate an element of the graph can be identified at 780. Furthermore, a subset of the set of data values that are related to the input value can be identified at 785. Once the subset has been identified, a statistical value can be calculated using the same statistical operation and the subset of data values to generate a statistical value that is relevant to the input value at 790. For example if a means operation was used to generate a bar in a bar chart, the means operation can also be applied to data values used in generating the bar that are related to the input value. This results in a statistical value that is based on the same statistical operation as was used to generate the bar but is targeted on data values that are related to the input value. Once the statistical value is calculated, the element in the graph can be annotated with the statistical value at 795. For example, a data point can be plot on the same axis as the bar to illustrate the effect that the input value has on the bar. This can be repeated for the other bars of the graph.

Figure 8:
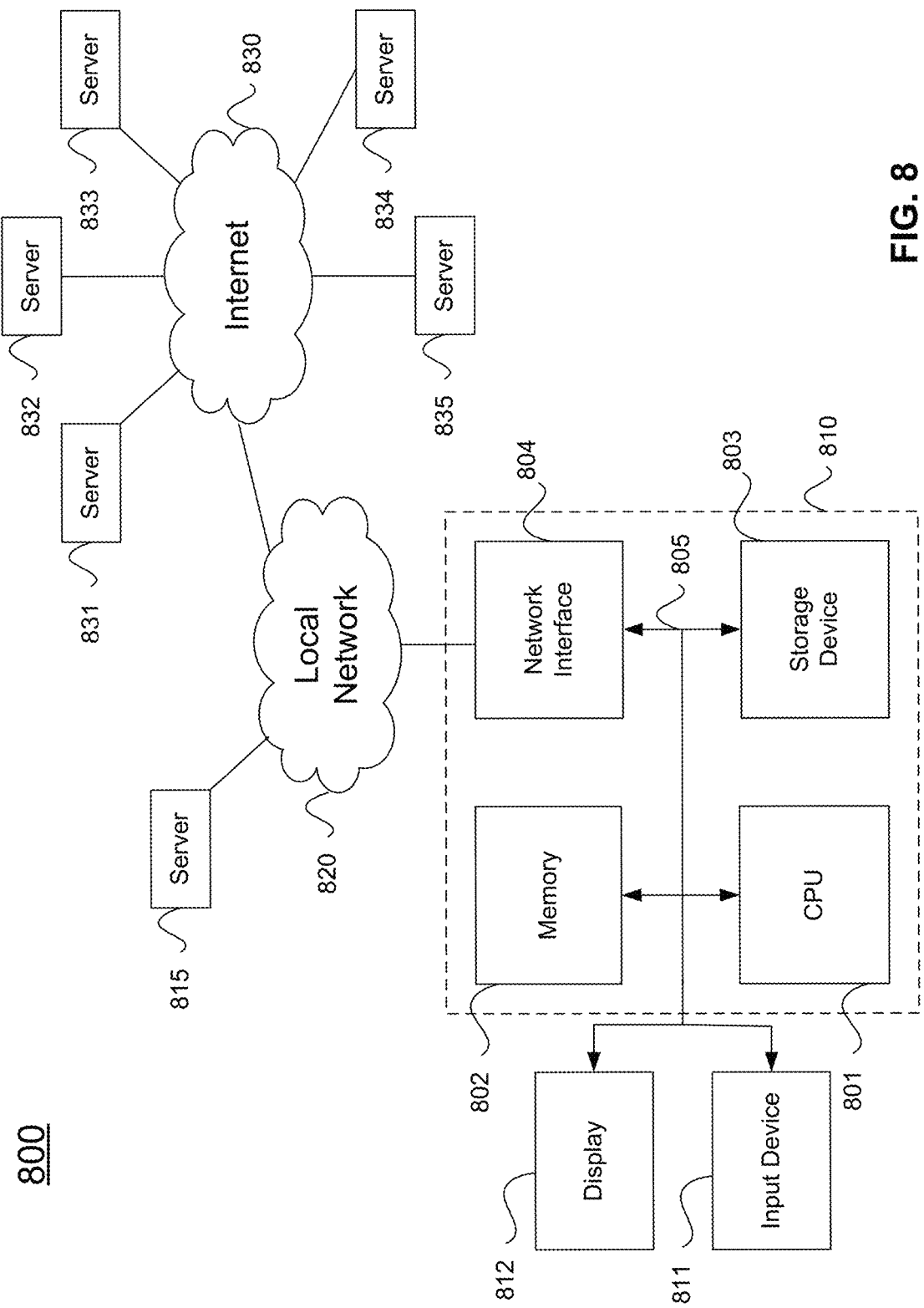
FIG. 8 illustrates an exemplary computer system.

An exemplary computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for visualizing a multi-variable dataset, comprising:
presenting a composite plot comprising a plurality of cells for analyzing data values in the multi-variable dataset, wherein each cell of the composite plot comprises a graph associated with a different pair of variables of the multi-variable data set and includes a plurality of elements configured to visualize a subset of data values that are related to the pair of variables;
receiving a request to perform an interactive function on a first element of a graph that relates the first element to another graph from the plurality of graphs, the first element representing an input value of a variable from the pair of variables; and
performing the interactive function in response to the request,
wherein when the request comprises an associative highlighting request, a graph type associated with the another graph is identified and associated highlighting is applied to the another graph based on the graph type, wherein applying the associative highlighting comprises:
identifying an aggregation process used in generating a second element of the another graph when the graph type is a bar chart; and
partially highlighting the second element of the another graph when the aggregation process is a sum operation, wherein the second element of the another graph is partially highlighted according to the portion of second element that is attributed to the input value.

2. The method of claim 1, wherein applying the associative highlighting further comprises highlighting elements in the another graph that represent the input value when the graph type is a scatterplot.

3. The method of claim 1, wherein applying the associative highlighting further comprises:
identifying a statistical operation used to generate the second element when the aggregation process is the statistical operation;
identifying a set of data values that are used in generating the second element;
identifying a subset of the set of data values that represent the input value;
calculating a statistical value based on the statistical operation and the subset of data values; and
annotating the second element in the another graph according to the statistical value.

4. A non-transitory computer readable storage medium storing one or more programs, the one or more programs comprising instructions for:
presenting a composite plot comprising a plurality of cells for analyzing data values in the multi-variable dataset, wherein each cell of the composite plot comprises a graph associated with a different pair of variables of the multi-variable data set and includes a plurality of elements configured to visualize a subset of the data values that are related to the pair of variables;
receiving a request to perform an interactive function on a first element of a graph that relates the first element to another graph from the plurality of graphs, the first element representing an input value of a variable from the pair of variables; and
performing the interactive function in response to the request,
wherein when the request comprises an associative highlighting request, a graph type associated with the another graph is identified and associated highlighting is applied to the another graph based on the graph type, wherein applying the associative highlighting comprises:
identifying an aggregation process used in generating a second element of the another graph when the graph type is a bar chart; and
partially highlighting the second element of the another graph when the aggregation process is a sum operation, wherein the second element of the another graph is partially highlighted according to the portion of second element that is attributed to the input value.

5. The non-transitory computer readable storage medium of claim 4, wherein applying the associative highlighting further comprises highlighting elements in the another graph that represent the input value when the graph type is a scatterplot.

6. The non-transitory computer readable storage medium of claim 4, wherein applying the associative highlighting comprises:
identifying a statistical operation used to generate the elements of the another graph when the aggregation process is the statistical operation;
identifying a set of data values that are used in generating the second element;
identifying a subset of the set of data values that represent the input value;
calculating a statistical value based on the statistical operation and the subset of data values; and
annotating the second element in the another graph according to the statistical value.

7. A computer implemented system, comprising:
a processor;
a display; and
memory storing instructions configured to:
present, on the display, a plurality of graphs for analyzing data values in the multi-variable dataset, wherein each graph is associated with a pair of variables and includes a plurality of elements configured to visualize a subset of data values that are related to the pair of variables,
receive an associative highlighting request on a first element of a graph, the first element representing an input value of a variable from the pair of variables,
identify an aggregation process used in generating a second element of another graph, and
partially highlighting the second element of the another graph when the aggregation process is a sum operation, wherein the second element of the another graph is partially highlighted according to the portion of second element that is attributed to the input value.

8. The system of claim 7, wherein the memory further stores instructions to:
identify a statistical operation used to generate the second element, when the aggregation process is the statistical operation;
identify a set of data values that are used in generating the second element;
identify a subset of the set of data values that represent the input value;
calculate a statistical value based on the statistical operation and the subset of data values; and
annotate the second element in the another graph according to the statistical value.

9. A method for visualizing a multi-variable dataset, comprising:
presenting, on a display, a plurality of graphs for analyzing data values in the multi-variable dataset, wherein each graph is associated with a pair of variables and includes a plurality of elements configured to visualize a subset of data values that are related to the pair of variables,
receiving an associative highlighting request on a first element of a graph, the first element representing an input value of a variable from the pair of variables,
identifying an aggregation process used in generating a second element of another graph, and
partially highlighting the second element of the another graph when the aggregation process is a sum operation, wherein the second element of the another graph is partially highlighted according to the portion of second element that is attributed to the input value.

10. The method of claim 9 further comprising:
identifying a statistical operation used to generate the second element, when the aggregation process is the statistical operation;
identifying a set of data values that are used in generating the second element;
identifying a subset of the set of data values that represent the input value;
calculating a statistical value based on the statistical operation and the subset of data values; and
annotating the second element in the another graph according to the statistical value.

11. A non-transitory computer readable storage medium storing one or more programs, the one or more programs comprising instructions for:
presenting, on a display, a plurality of graphs for analyzing data values in the multi-variable dataset, wherein each graph is associated with a pair of variables and includes a plurality of elements configured to visualize a subset of data values that are related to the pair of variables,
receiving an associative highlighting request on a first element of a graph, the first element representing an input value of a variable from the pair of variables,
identifying an aggregation process used in generating a second element of another graph, and
partially highlighting the second element of the another graph when the aggregation process is a sum operation, wherein the second element of the another graph is partially highlighted according to the portion of second element that is attributed to the input value.

12. The non-transitory computer readable storage medium of claim 11 wherein the one or more programs further comprise instructions for:

identifying a statistical operation used to generate the second element, when the aggregation process is the statistical operation;
identifying a set of data values that are used in generating the second element;
identifying a subset of the set of data values that represent the input value;
calculating a statistical value based on the statistical operation and the subset of data values; and
annotating the second element in the another graph according to the statistical value.

\* \* \* \* \*